United States Patent [19]

McCollom et al.

[11] Patent Number: 6,098,054

[45] Date of Patent: Aug. 1, 2000

[54] METHOD OF SECURING SOFTWARE CONFIGURATION PARAMETERS WITH DIGITAL SIGNATURES

[75] Inventors: William Girard McCollom; Julio Cesar Garcia; Darren Drew Smith, all of Fort Collins, Colo.

[73] Assignee: Hewlett-Packard Company, Palo Alto, Calif.

[21] Appl. No.: 08/970,064

[22] Filed: Nov. 13, 1997

[51] Int. Cl.[7] ........................................... G06F 9/44
[52] U.S. Cl. .................................. 705/59; 705/51
[58] Field of Search ....................... 705/51, 59

[56] References Cited

U.S. PATENT DOCUMENTS

| | | | |
|---|---|---|---|
| 4,981,370 | 1/1991 | Dziewit et al. | 380/25 |
| 5,031,214 | 7/1991 | Dziewit et al. | 380/23 |
| 5,058,162 | 10/1991 | Santon et al. | 705/51 |
| 5,163,091 | 11/1992 | Dziewit et al. | 380/23 |
| 5,191,613 | 3/1993 | Dziewit et al. | 380/25 |
| 5,327,563 | 7/1994 | Singh | 713/193 |
| 5,375,206 | 12/1994 | Hunter et al. | 395/12 |
| 5,745,879 | 4/1998 | Wyman | 705/1 |
| 5,758,068 | 5/1998 | Brandt et al. | 713/200 |
| 5,758,069 | 5/1998 | Olsen | 713/201 |
| 6,012,033 | 1/2000 | Vanden Berge | 705/1 |
| 6,023,766 | 2/2000 | Yamamura | 713/201 |

OTHER PUBLICATIONS

Bruce Schneier, Applied Cryptography: Protocols, Algorithms and Source Code in C, Second Edition, 483, Oct. 1995.

GLOBEtrotter Software, Inc., FLEXlm Reference Manual: Version 5.1, Nov. 1996.

GLOBEtrotter Software, Inc., FLEXlm Programmer's Manual: Version 5.1, Nov. 1996.

Bruce Schneier, Applied Cryptography: Protocols, Algorithms and Source Code in C, Second Edition, 563–65, Oct. 1995.

GLOBEtrotter Software, Inc., FLEXlm Reference Manual: Version 6.0, Oct. 1997.

*Primary Examiner*—Eric W. Stamber
*Assistant Examiner*—Michael Pender

[57] ABSTRACT

A system and method for enforcing configuration parameters and detecting tampering of configuration files used by a software application. An enforced configuration packet (ECP) file generator generates an enforced configuration packet (ECP) file from a configuration parameter description file containing a set of configuration parameters. The ECP file includes a set of enforced configuration packets, which each include one of the configuration parameters from the ECP description file and a corresponding configuration parameter fingerprint unique to that particular configuration parameter. At startup of the software application, an ECP file reader validates the ECP file and each of the enforced configuration packets contained in the ECP file. Validation is achieved by regenerating the configuration parameter fingerprint of each configuration parameter and comparing the regenerated fingerprint to the fingerprint contained in the enforced configuration packet. If any of the fingerprints in the enforced configuration packets do not match their regenerated fingerprint, the ECP file reader indicates that the configuration parameter fingerprint is not valid. If all of the configuration parameter fingerprints match up to their regenerated fingerprints, and the ECP file itself is determined to be valid, the configuration parameters encoded in the ECP file are used by the software application to set up its configuration.

16 Claims, 4 Drawing Sheets

ECP DESCRIPTION FILE

```
REG_FILE, CONFIG_1
REG_FILE, CONFIG_2
FILTER_FILE, FILTER_1
MAP_NAME, MAP_1
USER_COUNT 1
```

*FIG. 2*

PARAMETER ID REGISTRATION DATA STRUCTURES

```
REG_FILE:
    TYPE:    STRING LIST;
    FLAGS:   CheckContents, RelativePath;
    PATH:    "C:\APPLICATION\CONFIG\"
FILTER_FILE:
    TYPE:    STRING;
    FLAGS:   CheckContents, RelativePath, Overridable;
    PATH:    "C:\APPLICATION\CONFIG"
MAP_NAME:
    TYPE:    STRING;
    FLAGS:
    PATH:
USER_COUNT:
    TYPE:    INTEGER;
    FLAGS:
    PATH:
```

*FIG. 3*

ECP FILE

```
<BOF FINGERPRINT>
REG_FILE, CONFIG_1, FINGERPRINT_1;
REG_FILE, CONFIG_2, FINGERPRINT_2;
FILTER_FILE, FILTER_1, FINGERPRINT_3;
MAP_NAME, MAP_1, FINGERPRINT_4;
USER_COUNT, 1, FINGERPRINT_5;
<EOF FINGERPRINT>
```

METHOD OF SECURING SOFTWARE CONFIGURATION PARAMETERS WITH DIGITAL SIGNATURES

FIELD OF THE INVENTION

The present invention relates generally to the field of software security, and more particularly to a system and method for securing software configuration parameters with digital signatures.

BACKGROUND OF THE INVENTION

Present day computer software is typically generated by a software manufacturer and shipped as a set of files. These files may include an installation program, one or more executable files, a set of library or data files, and configuration files. Typically, the end user of the software runs the installation program, which copies the executable files and libraries into appropriate directories, and configures the software according to configuration parameters contained in the configuration files. Often, the software configuration may be customized by either an intermediate customer (i.e, an Original Equipment Manufacturer (OEM) or Value Added Reseller (VAL) selling to end users) or by the software manufacturer working with the intermediate customer to meet the customers' particular needs. Software configuration customization is typically achieved today by providing a set of user customizable configuration files which may be modified by the intermediate customer, or by the manufacturer according to the customer's specifications, to configure the software to provide specific software options for the end user. An example of a configuration file may be a menu registration file that contains configuration parameters that describe the types, layout and functionality of menu bars displayed in conjunction with, and utilized by, the software application. The menu registration file is typically in text format, where each different menu bar is specified by including an entry containing a menu identifier and textual description of the contents or functionality of the menu. The contents of the menu registration file are used to generate the menu bar. Accordingly, if a customer requires an additional menu bar, the menu registration file may be modified to include an entry containing the menu identifier and information from which to generate the new menu bar or additional files from which to add new functionality to the menus.

The above described mechanism for providing customer-specific software configurations is both efficient and convenient in terms of development and maintainability for software manufacturers, intermediate customers, and end users. Specifically, the original executable software may be modified, and the new revision may be shipped and installed by end users without requiring a special version of software to be created for each customer specific configuration. In addition, an intermediate customer may add, remove, and modify configurable features that it wants to ship to its end users simply by modifying the customer specific configuration files, rather than requiring a special version of software to be created for its new customer specific configuration.

One aspect of providing customizable configuration files that has heretofore been unaddressed is the vulnerability of the customizable configuration files to end-user tampering. Specifically, software manufacturers provide non-secure customizable configuration files to allow an intermediate customer to edit these configuration files, as for example to specify particular menu items and software functionality. However, these same customizable configuration files containing customized configuration parameters may also be shipped to the end user in non-secure form. It may be undesirable to certain customers to allow end users to have access to its customer specific configuration files. Accordingly, a need exists for a mechanism which allows a software manufacturer and a customer to customize the software configuration and then to secure the configuration parameters to disallow tampering by unauthorized users.

SUMMARY OF THE INVENTION

A novel system method of enforcing a software configuration parameters in a software application for end users and for ensuring that configuration parameters and configuration files have not been tampered with is presented herein. In accordance with the system of the invention, an enforced configuration packet (ECP) file generator is provided to generate an enforced configuration packet (ECP) file from a configuration parameter description file, which contains a set of desired configuration parameters. The ECP file generator generates a fingerprint for each of the configuration parameters contained in the ECP description file and packages them each into a respective enforced configuration packet which is output to the ECP file. Each enforced configuration packet includes a configuration parameter and a configuration parameter fingerprint. Further in accordance with the system of the invention, an ECP file reader is provided which validates the enforced configuration packet in the ECP file and reads the configuration parameters if the ECP file and each of the ECP configuration parameters are valid. If any of the ECP configuration parameters or the file itself is invalid, the ECP file reader indicates that the configuration parameter is not valid.

In a preferred embodiment, a configuration parameter may include a name of a file or a string of filenames whose contents are included when generating the configuration parameter fingerprint. Also in a preferred embodiment, a configuration parameter may be overridable by a corresponding configuration parameter encoded in another ECP file such that as long as at least one of the enforced configuration packets in one of the ECP files includes a valid fingerprint of the configuration parameter, the ECP file reader interprets it as valid.

A key parameter may be used to generate a key fingerprint to allow only authorized users to run the application. Typically, the key parameter will be an intermediate customer key, which may be included for example in a software registration code shipped with the software. Without a valid key parameter, the ECP file reader does not return the configuration parameters, and accordingly, the software application will not allow the user to run the application.

An additional security feature is the inclusion of an end-of-file (EOF) fingerprint appended to the end of the ECP file. The EOF fingerprint is generated on the entire contents of the ECP file to ensure that none of the contents of the ECP file itself have been tampered with.

In accordance with the invention, the method includes steps for generating a configuration parameter description file comprising a configuration parameter, generating an enforced configuration packet (ECP) file comprising the configuration parameter and a configuration parameter fingerprint, and providing the software application with means for validating the enforced configuration packet in the ECP file. Preferably, the software application includes steps for utilizing the configuration parameter if the enforced configuration packet is valid, and disallowing use of the configuration parameter if the enforced configuration packet is not valid. To ensure that the contents of files named in the configuration parameter, the configuration parameter fingerprint may also be generated on contents of the file or files named in the configuration parameter.

To ensure that an authorized user is running the application, the method of the invention may also include a step for generating a key fingerprint on a key parameter and appending the key fingerprint to the contents of the ECP file, wherein the key parameter must be known to validate the ECP file. The method may also include a step for requiring the means for validating the enforced configuration packet in the ECP file to perform the steps of generating a regenerated key fingerprint on the key parameter; comparing the regenerated key fingerprint to the key fingerprint in the ECP file; and returning an error code if the regenerated key fingerprint and the key fingerprint do not match.

To ensure that the ECP file itself has not been tampered with, the method of the invention may also include steps for generating an end-of-file (EOF) fingerprint on entire contents of the ECP file after the enforced configuration packets are generated and appending the EOF fingerprint to the contents of the ECP file; and requiring the means for validating the enforced configuration packet in the ECP file to perform the steps of generating a regenerated end-of-file (EOF) fingerprint on the contents of the ECP file; comparing the regenerated EOF fingerprint to the EOF fingerprint in the ECP file; and returning an error code if the regenerated EOF fingerprint and the EOF fingerprint do not match.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawing, of which:

FIG. 2 is an example format of an ECP description file;

FIG. 3 is an example data structure format for registration of configuration parameter IDs;

FIG. 4 is an example format of an ECP file;

DETAILED DESCRIPTION OF THE PRESENT INVENTION

A mechanism for securing software configuration parameters is described herein which provides the ability for a software manufacturer and a customer to customize the software configuration and then to secure the configuration parameters to disallow tampering by unauthorized users. Specifically, after the customer determines its desired customer specific configuration, the configuration parameters and files are secured in an enforced configuration package. At software installation or startup time, the enforced configuration packages are validated to determine whether tampering has occurred. If tampering of the enforced configuration packages is detected, the software application is alerted and handles the tamper message accordingly.

Figure 1:
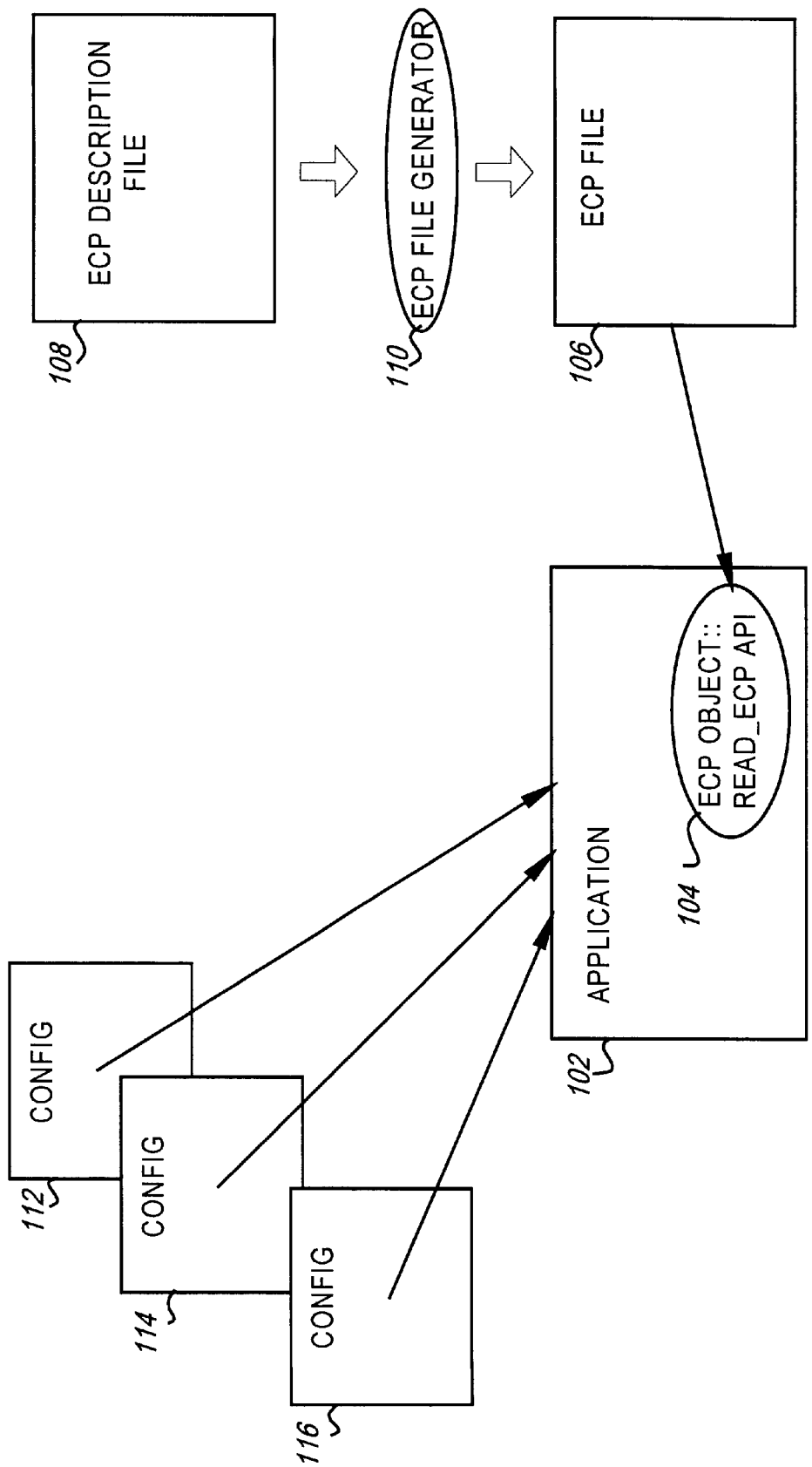
FIG. 1 is a block diagram of a system in which the invention may operate.

FIG. 1 illustrates a block diagram of a system in which the invention may operate. In FIG. 1, software application 102 may be configured using any or all of configuration files 112, 114, 116 as determined by the contents of ECP file 106. Software application 102 is typically shipped with all of configuration files 112–116. If no ECP file exists and the software is licensed for a full configuration, application 102 configures itself using all of configuration files 112, 114, 116, ignoring any existing ECP files. If the software is licensed for a limited configuration, however, software application 102 searches for an ECP file. If an ECP file does not exist under a limited configuration license, software application 102 preferably will not allow the user to run it. If an ECP file does exist under a limited configuration license, however, the read ECP file routine 104 reads and validates the ECP file and extracts the customer specific configuration (i.e., the particular configuration files 112–116 to utilize when configuring the software). ECP file 106 includes configuration parameter entries which each preferably include a parameter identifier, a parameter value, and a parameter fingerprint. ECP file 106 is generated from an ECP description file 108 using an ECP file generator 110. The ECP description file 108 is typically developed by an intermediate customer, or by the software manufacturer working in conjunction with the intermediate customer. The ECP file 106 is then generated at the factory using ECP file generator 110. Preferably, only the ECP file 106 (and not the ECP description file 108) is shipped to end users to prevent end users from tampering with the customer specific configuration parameters.

As also shown in FIG. 1, application 102 includes an ECP file reader routine 104. In a preferred embodiment, and as embodied in FIG. 1, application 102 is implemented in an object-oriented language such as C++, and the ECP file reader routine 104 is implemented in an ECP object comprising a READ_ECP API method. Application 102 executes a method call on READ_ECP of the ECP object. READ_ECP accesses ECP file 106, validates each entry utilizing its associated fingerprint and any files associated with each entry that are required to also be validated, and either returns the configuration encoded in the ECP file 106 if no tampering is detected, or an error code if tampering is detected. If no tampering is detected, the value returned by the READ_ECP method indicates which configuration files 112–116 the software application 102 is to use for its configuration. For example, if the ECP file includes entries for configuration files 112 and 114, application 102 configures itself using configuration files 112 and 114, but not configuration file 116.

FIG. 2 is an example format of an ECP description file. As shown in FIG. 2, each configuration parameter entry is set forth on a separate line in the format <ID, value> which includes a configuration parameter identifier (ID) and a configuration parameter value. The configuration parameter ID is a pre-defined identifier whose name and type are known by the ECP file generator 110. The configuration parameter value is the actual value of the configuration parameter. The type of the value must correspond to the type of the ID as defined within the ECP file generator 110.

Preferably, each configuration parameter ID is a parameter name which is registered within the ECP file generator 110 and which has a parameter type and a set of parameter flags associated with it. The parameter name, type, and flags are preferably defined in a static data structure within the ECP file generator 110. FIG. 3 illustrates an example data structure format for registration of configuration parameter IDs. In the preferred embodiment, a parameter type may be a "string" for elements such as a file name, a "string list" for elements such as a list of event categories or list of files, or an "integer" for elements such as counters or other scalar values.

In addition, the parameter flags indicate the type of validation that should be performed on the parameter by the ECP file reader routine 104 when the ECP file is validated and read. In the embodiment shown in FIG. 2, the parameter flags may include a "CheckContents" flag which tells the ECP file generator 110 that the configuration parameter, of type string or string list, contains a file or files whose contents must be digitally signed, thus making them tamper proof. The parameter flags may also include a "RelativePath" flag which indicates to the ECP file generator 110 that the configuration parameter is a file whose path is relative from a defined location, which is preferably registered within the ECP file generator 110 in the parameter name data structure. The parameter flags may also include an "Overridable" flag which indicates to the ECP file generator 110 that multiple packages may define the parameter and that at least one of them should have a valid entry. This flag may be used for items such as where the application expects to find either a default item that is always shipped with the software or a customized item that the customer ships to the end user. It will be appreciated by those skilled in the art that the format of the ECP description file may vary from implementation to implementation. Accordingly, the embodiment of FIG. 2 is shown by way of example only, and not limitation.

In the example ECP description file shown in FIG. 2 and corresponding registration data structures shown in FIG. 3, REG_FILE is a configuration parameter ID of type string list having the CheckContents flag set, which indicates that the fingerprint generated for the configuration parameter should include the contents of the file named in the configuration parameter value, and the RelativePath flag set, to indicate that the named file value may be found at the relative path value "C:\APPLICATION\CONFIG\". In this embodiment, each element in the string list is declared on a separate line but is made available via the READ_ECP API method implemented in the ECP file reader routine 104 as a list of all defined values having ID REG_FILE. As also seen in the example of FIGS. 2 and 3, FILTER_FILE is a configuration parameter ID of type string, and has flags CheckContents, RelativePath, and Overridable set, which indicate that the contents of the named file, FILTER_1 should be included in the fingerprint, that the directory where FILTER_1 may be found is in "C:\APPLICATION\CONFIG", and that the file FILTER_1 may be overridden by a customer specific filter file. As also seen in the example of FIGS. 2 and 3, MAP_NAME is a configuration parameter ID of type string, a USER_COUNT is a configuration parameter of type integer.

FIG. 4 is an example format of an ECP file generated by ECP file generator 110 from the example ECP file shown in FIG. 2. As shown in FIG. 4, the ECP file looks identical to the ECP description file, except that each configuration parameter entry includes not only a configuration parameter identifier (ID) and a configuration parameter value, but also a digital fingerprint value. In other words, each entry in the ECP file is set forth on a separate line in the format <ID, value, fingerprint>. The value of each fingerprint is preferably a digital signature of the configuration parameter ID, value, and contents of the file named in the configuration parameter value if the CheckContents flag is set. Preferably, the digital signature is generated using a combination of a digital signature generation algorithm (e.g., the well-known MD5 algorithm) and an encryption algorithm (e.g., the well-known Tiny Encryption Algorithm (TEA)) to allow the fingerprint to be easily generated, yet difficult to reverse engineer without the proper key. In a preferred embodiment, the proper key for regenerating the fingerprint is encoded into the license registration number of the software application. The purpose of the configuration parameter fingerprint is to ensure that the parameter and its value (and the value's contents, if applicable) have not been tampered with. In addition to each configuration parameter entry having an associated fingerprint, the ECP file embodied in FIG. 4 also includes a beginning of file (BOF) fingerprint and an end of file (EOF) fingerprint. The BOF fingerprint is preferably a digital signature on a customer key assigned to the particular intermediate customer. Typically the customer key is derived from a license registration number shipped with the software. The purpose of the BOF fingerprint is to ensure that the ECP file is used only on the customer's platform and also ensures the integrity of the ECP file and customer key. The EOF fingerprint is a final digital signature on the entire contents of the ECP file. The purpose of the EOF fingerprint is to ensure that the ECP file itself has not been tampered with.

Figure 5:
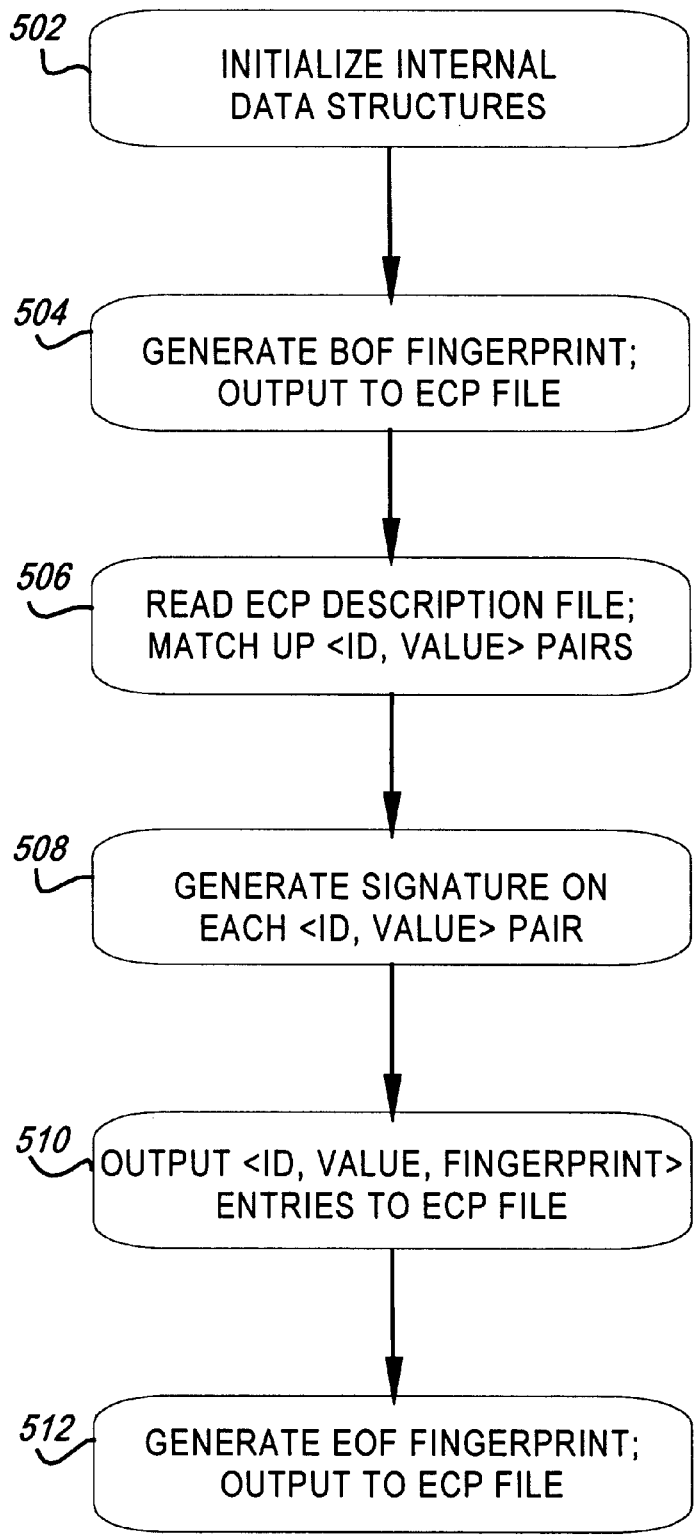
FIG. 5 is a flowchart of the functionality of a preferred implementation of an ECP file generator.

FIG. 5 is a flowchart of the functionality of a preferred implementation of ECP file generator 110. As shown in FIG. 5, ECP file generator 110 begins with step 502 by initializing its internal data structures, as shown in FIG. 3. Accordingly, a data structure is allocated for each predefined configuration parameter identifier, and the type, flags, and relative path associated with that particular configuration parameter ID are set according to its definition (i.e., ID name, type, flags, and path) as known by the ECP file generator 110. Thus, as illustrated in FIG. 3, a data structure is allocated for each ID (i.e., REG_FILE, FILTER_FILE, MAP_NAME, and USER_COUNT), and the values of its associated type, flags and path are filled in. The configuration parameter ID definitions may be defined statically within the software, or may be configurable as for example by storing all configuration parameter ID definitions in a table or separate file which may be modified to support different configuration parameter IDs.

In a step 504, the ECP file generator 110 reads the customer key, which may be input as a parameter to the ECP file generator 110 or may be at a location known by the ECP file generator 110. After reading the customer key, the ECP file generator 110 generates a digital signature on the customer key and outputs it as the BOF fingerprint to the ECP file 106.

The ECP file generator 110 then reads the ECP description file 108 in step 506 to identify ID, value pairs. In a preferred embodiment, the ECP file generator 110 creates a table containing each ID in one column, and all values associated with that ID in a second column.

In a step 508, the ECP file generator 110 then generates a fingerprint for each of the ID value pairs. The fingerprint for an ID value pair may include the actual name of the configuration parameter ID (e.g., REG_FILE) and the value of the configuration parameter (e.g., CONFIG_1). If the CheckContents flag for the configuration parameter is set, the fingerprint will also include the digital signature of the file that was described by that parameter. As an illustration, the value of each configuration parameter of ID REG_FILE is actually the name of a file. Because CheckContents is set for all configuration parameters having a REG_FILE ID, the contents of each file named as a value of REG_FILE is included in the signature for the ID, value pair.

In a step 510, the ECP file generator 110 outputs the <ID, value, fingerprint> entries to ECP file 106.

In a step 512, ECP file generator 110 generates an end-of-file (EOF) fingerprint on the entire contents of the ECP file 106 and appends the EOF fingerprint to the end of the ECP file 106.

Figure 6:
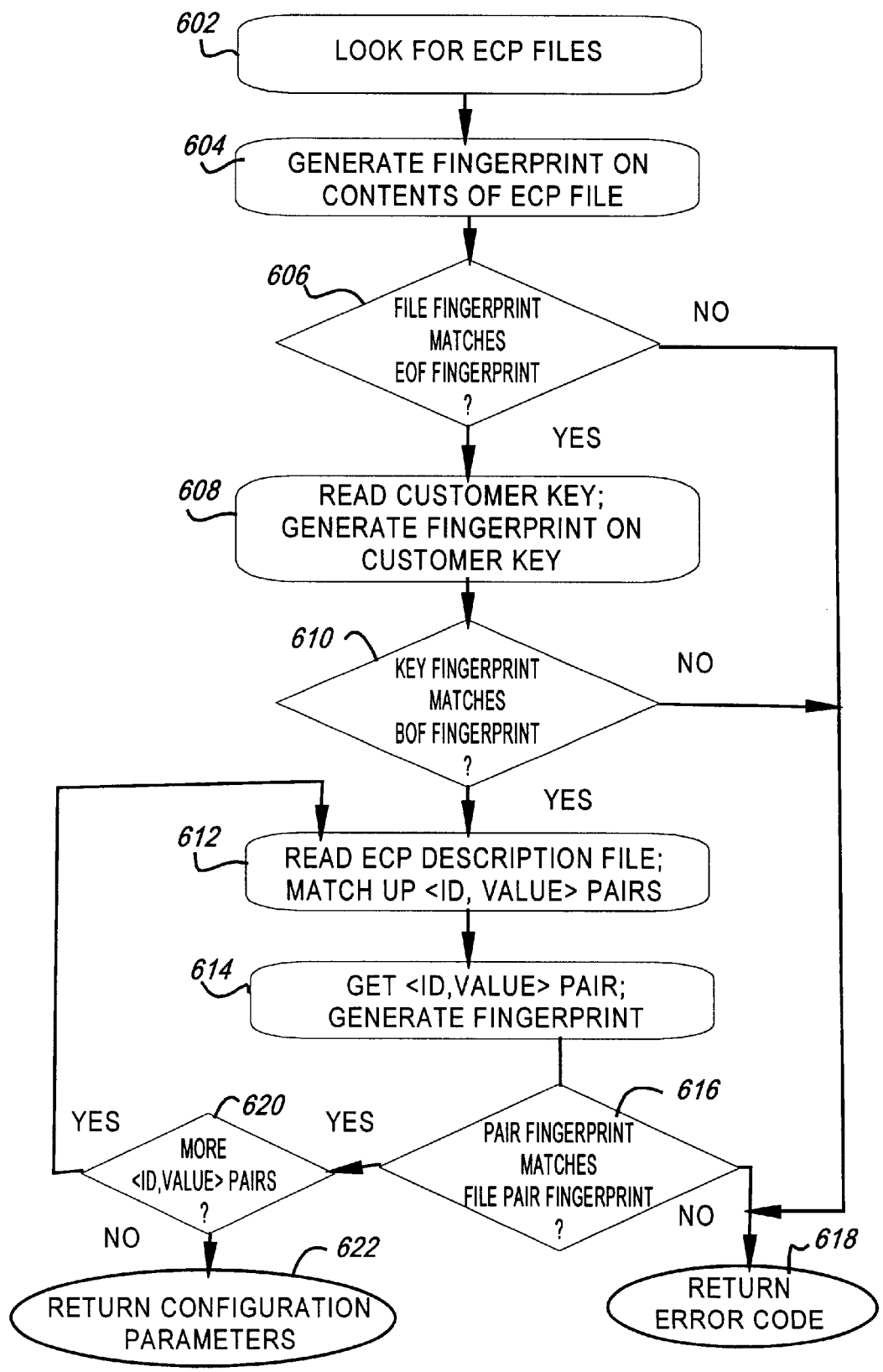
FIG. 6 is a flowchart of the functionality of a preferred implementation of an ECP file reader.

FIG. 6 is a flowchart of the functionality of a preferred implementation of the read ECP file routine 104. As shown in FIG. 6, ECP file routine 104 begins with step 602 by looking for ECP files. In the preferred embodiment, the location of the ECP files are known by the read ECP file routine 104. Preferably the software is shipped with a customer specific default ECP file. To allow intermediate customers to provide different configurations to different end user customers, the intermediate customer may be provided with an ECP file generator to allow it to generate one or more additional ECP files which contain configuration parameters that override the default configuration parameters. This allows the intermediate customer to ship the software manufactured by the software manufacturer containing its customer specific default ECP file along with one or more additional configuration files it may have developed to operate with the software and an accompanying ECP file to prevent end users from modifying the configuration files and parameters. In this embodiment, the ECP file reader routine 104 looks in a particular directory for the default ECP file and any additional customer generated ECP files.

In a step 604, ECP file reader routine 104 generates a fingerprint on the entire contents of the ECP file 106 and compares it in step 606 to the EOF fingerprint to the end of the ECP file 106. If the fingerprint does not match the EOF fingerprint, the ECP file reader routine 104 returns an appropriate error code in step 618 and exits.

If the EOF fingerprint is valid, the ECP file generator 110 then reads the customer key in step 608, which may be input as a parameter to the ECP file generator 110 or may be at a location known by the ECP file generator 110. After reading the customer key, the ECP file generator 110 generates a fingerprint on the customer key and compares it to the BOF fingerprint in the ECP file 106 in step 610. If the fingerprint does not match the BOF fingerprint, the ECP file reader routine 104 returns an appropriate error code in step 618 and exits.

If the BOF fingerprint is valid, the ECP file reader routine 104 then reads the ECP description file 108 in step 612 to identify and match up ID, value pairs. In a preferred embodiment, the ECP file reader routine 104 creates a table containing each ID in one column, and all values associated with that ID in a second column.

In a step 614, the ECP file reader routine 104 then generates a fingerprint for each <ID, value> pair and compares in step 616 the generated fingerprint with the corresponding fingerprint contained in the ECP file. The fingerprint for an ID value pair may include the actual name of the configuration parameter ID (e.g., REG_FILE) and the value of the configuration parameter (e.g., CONFIG_1). If the CheckContents flag for the configuration parameter is set, the fingerprint will also include the digital signature of the file that was named as the value of that parameter. If the Overridable flag is set for an ID, the ECP file reader routine 104 interprets this to mean that more than one possible files exist as the value of this particular configuration parameter. For example, a default filter file may be shipped with the software application which the customer may override with a customer-specific filter file. In this case, it may still be desired to secure the configuration parameter (i.e., the default filter file itself). Accordingly, the CheckContents flag is set to indicate to the ECP file reader routine 104 to include the contents of the default configuration file when generating the fingerprint for the configuration parameter. In addition, the Overridable flag indicates to the ECP file reader routine 104 that a customer specific filter file may exist, and as long as one of the potential configuration files has a valid fingerprint, no error should be signaled.

Once a fingerprint is generated for an <D, value> pair, the fingerprint is compared to the fingerprint of the <ID, value> pair from the ECP file 106 in a step 616. If the fingerprints do not match, an appropriate error is returned in step 618.

If the fingerprints do match, a step 620 checks for additional <ID, value> pairs to validate, and steps 612–620 are repeated until each of the <ID, value> pairs have been validated If each of the <ID, value> configuration parameter pairs are properly validated, all of the configuration parameters in the ECP file are return in step 622.

In a preferred embodiment of the software application 102 of FIG. 1, which as described earlier is implemented in an object-oriented language such as C++, the ECP object implementing the ECP file reader routine 104 is initialized at startup of the application 102. Accordingly, at initialization, the READ_ECP API method searches for ECP file 106, validates and reads ECP file 106, and returns a list of configuration files (i.e., any combination of configuration files 112–116) according to which the application 102 is to be configured. Application 102 then reads each configuration file in the returned list and configures itself according to those configuration files. The listed configuration files describe the look and functionality of the software application to the end user according to the customer's specifications.

As described in detail above, the present invention provides a method of enforcing a software configuration for end users. In addition, the invention provides a method for ensuring that configuration parameters and configuration files have not been tampered with. It will be appreciated by those skilled in the art that the principles of the present invention may be extended to enforce any type of static mapping of name to values, and to determine whether any type of data storage files have been tampered with. Accordingly, while illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A system for securing software configuration parameters used by a software application, comprising:

an enforced configuration packet (ECP) file generator which receives a configuration parameter description file comprising a configuration parameter, said configuration parameter comprising one or more file names that reference one or more files, and which generates an enforced configuration packet (ECP) file comprising an enforced configuration packet (ECP), said ECP comprising said configuration parameter and a configuration parameter fingerprint generated over said configuration parameter and said one or more files referenced by said one or more file names; and an ECP file reader which validates said ECP and provides an indication if said ECP is invalid.

2. The system of claim 1, wherein:

said software application utilizes said configuration parameter if said ECP file reader does not indicate that any of said one or more enforced configuration packets is invalid, and disallows use of said configuration parameter if said ECP file reader does indicate that any of said one or more enforced configuration packets is invalid.

3. The system of claim 1, said ECP file generator generating a key fingerprint on a key parameter and appending said key fingerprint to said contents of said ECP file, said key parameter being required to be known to validate said enforced configuration packet.

4. The system of claim 3, said ECP file reader generating a regenerated key fingerprint on said key parameter, comparing said regenerated key fingerprint to said key fingerprint in said ECP file, and returning an error code if said regenerated key fingerprint and said key fingerprint do not match.

5. The system of claim 1, said ECP file generator generating an end-of-file (EOF) fingerprint on entire contents of said ECP file after said enforced configuration packets are generated and appending said EOF fingerprint to said contents of said ECP file.

6. The system of claim 5, said ECP file reader generating a regenerated end-of-file (EOF) fingerprint on said contents of said ECP file, comparing said regenerated EOF fingerprint to said EOF fingerprint in said ECP file, and returning an error code if said regenerated EOF fingerprint and said EOF fingerprint do not match.

7. The system of claim 1, wherein:

said configuration parameter comprises an override option which indicates to said ECP file reader to validate a corresponding ECP in at least one other ECP file and to provide said indication only if each of said ECP and said corresponding ECP in each of said at least one other ECP file is invalid.

8. A method for securing and enforcing software configuration parameters used by a software application, said method comprising the steps of:

reading a configuration parameter, said configuration parameter comprising one or more file names that reference one or more files;

generating a configuration parameter fingerprint over said one or more files referenced by said one or more file names in said configuration parameter;

generating an enforced configuration packet (ECP) comprising said configuration parameter and said configuration parameter fingerprint; and generating an enforced configuration packet (ECP) file comprising said ECP.

9. The method of claim 8, comprising:

reading said ECP from said ECP file;

validating said ECP; and providing an indication if said ECP is invalid.

10. The method of claim 8, further comprising the steps of:

generating a first key fingerprint on a first key parameter;

inserting said first key fingerprint into said ECP file.

11. The method of claim 8, further comprising the steps of:

generating an end-of-file (EOF) fingerprint over said entire ECP file; and inserting said EOF fingerprint into said ECP file.

12. The method of claim 9, further comprising the steps of:

validating a corresponding ECP in at least one other ECP file; and providing said indication only if each of said ECP and each of said corresponding ECP in said at least one other ECP file are invalid.

13. The method of claim 10, comprising:

obtaining a second key parameter;

generating a second key fingerprint over said second key parameter;

comparing said first key parameter with said second key parameter;

providing an invalid key indication if said second key parameter does not match said first key parameter;

reading said ECP from said ECP file;

validating said ECP; and providing an invalid ECP indication if said ECP is invalid.

14. The method of claim 13, comprising:

extracting said EOF fingerprint from said ECP file;

generating an EOF validation fingerprint over said ECP file less said EOF fingerprint;

comparing said EOF validation fingerprint with said EOF fingerprint; and providing an invalid file indication if said EOF validation fingerprint does not match said EOF fingerprint.

15. The method of claim 11, comprising:

extracting said EOF fingerprint from said ECP file;

generating an EOF validation fingerprint over said ECP file less said EOF fingerprint;

comparing said EOF validation fingerprint with said EOF fingerprint;

providing an invalid file indication if said EOF validation fingerprint does not match said EOF fingerprint;

reading said ECP from said ECP file;

validating said ECP; and providing an invalid ECP indication if said ECP is invalid.

16. A method for enforcing software configuration parameters used by a software application that are secured in an enforced configuration parameter (ECP) file comprising one or more enforced configuration packets (ECPs) each of which comprises a configuration parameter comprising one or more file names that reference one or more files and a configuration parameter fingerprint generated over said one or more files, said method comprising the steps of:

reading an ECP from said ECP file;

extracting said configuration parameter fingerprint from said ECP;

extracting said one or more file names from said ECP;

regenerating said configuration parameter fingerprint over said one or more files referenced by said extracted one or more file names;

comparing said regenerated configuration parameter fingerprint with said extracted configuration parameter fingerprint; and providing an indication if said regenerated configuration parameter fingerprint does not match said extracted configuration parameter.

* * * * *